United States Patent [19]

Francioni

[11] Patent Number: 5,183,144
[45] Date of Patent: Feb. 2, 1993

[54] APPARATUS FOR ORIENTING PRODUCTS ON A CONVEYOR LINE PARTICULARLY FOR AUTOMATIC PACKAGING MACHINES AND METHOD RELATING THERETO

[75] Inventor: Renzo Francioni, Prato Sesia, Italy
[73] Assignee: Cavanna S.p.A., Italy
[21] Appl. No.: 832,885
[22] Filed: Feb. 10, 1992

Related U.S. Application Data

[63] Continuation of Ser. No. 567,891, Aug. 15, 1990, abandoned.

[30] Foreign Application Priority Data

Aug. 16, 1989 [IT] Italy ................... 67706 A/89

[51] Int. Cl.$^5$ .............................. B65G 47/24
[52] U.S. Cl. ................... 198/382; 198/395; 198/415; 198/817
[58] Field of Search ............ 198/382, 394, 395, 399, 198/410, 415, 434, 817; 271/227, 228, 265

[56] References Cited

U.S. PATENT DOCUMENTS

| | | | |
|---|---|---|---|
| 3,084,090 | 4/1963 | Rambo et al. | 198/415 X |
| 3,603,446 | 9/1971 | Maxey et al. | 198/415 X |
| 4,807,739 | 2/1989 | Wolf et al. | 198/415 |
| 4,901,842 | 2/1990 | Lemboke et al. | 198/415 |
| 4,944,505 | 7/1990 | Sherman, III | 271/227 X |
| 4,971,304 | 11/1990 | Lofthus | 198/395 X |

FOREIGN PATENT DOCUMENTS

| | | |
|---|---|---|
| 3245981 | 6/1984 | Fed. Rep. of Germany . |
| 2550472 | 2/1985 | France . |
| 2144698 | 3/1985 | United Kingdom . |
| 2186252 | 8/1987 | United Kingdom . |

*Primary Examiner*—Joseph E. Valenza
*Assistant Examiner*—Tuan N. Nguyen
*Attorney, Agent, or Firm*—Evenson, Wands, Edwards, Lenahan & McKeown

[57] ABSTRACT

An apparatus and method is disclosed for conveying The products, for example confectionery products such as bars of chocolate, etc., possibly already contained in individual wrappers, are advanced with one of their principal axes substantially perpendicular to the direction in which they are transported. The apparatus comprises a pair of conveyor formations, such as endless belts, which can be made to travel at different speeds so as to achieve a condition in which the principal axes of the products are exactly perpendicular to the direction of advance at the output of the device.

23 Claims, 4 Drawing Sheets

FIG. 7

APPARATUS FOR ORIENTING PRODUCTS ON A CONVEYOR LINE PARTICULARLY FOR AUTOMATIC PACKAGING MACHINES AND METHOD RELATING THERETO

This is a continuation of application Ser. No. 07/567,891, filed Aug. 15, 1990, now abandoned.

BACKGROUND AND SUMMARY OF THE INVENTION

The present invention relates in general to apparatus for orienting products and, more specifically, to apparatus having at least two conveyor formations, separate drives for the conveyor formation, sensors for detecting the orientation of each product and controls for varying the speed of movement of the conveyor formations to annul a displacement of a principal axis of a product from a condition in which the principal axis is perpendicular to the direction of transportation. The present invention has been developed with particular attention to its possible use in the field of automatic packaging machines.

In this field of use, products being packaged (for example confectionery products such as bars of chocolate and the like, possibly already contained in individual wrappers) are currently advanced with one of their principal axes, usually the major axis, arranged approximately perpendicular to the direction of advance. This situation is common, for example, in machines which form so-called "multi-pack" packages, in which individual products inserted in respective "flow-pack" or "form-fillseal" wrappers are advanced towards a further wrapping station for insertion, in groups containing a predetermined number of units, in similar packages of larger dimensions.

As the products advance, phenomena of various kinds, either random in character or pseudo-deterministic in nature, such as slippage on the conveyor belt, slight holding back of the product resulting from a certain outward projection of the longitudinal join in the wrapper or the presence of a flap at one end of the wrapper which is slightly larger than the flap at the opposite end, may mean that an individual product does not advance with its principal axis exactly perpendicular to the direction of advance.

A situation of this kind may have adverse effects, for example when a flow of products advancing sideways must be transferred onto a bladed conveyor which provides for their positive entrainment. For instance, if the blades have a certain transverse length, or if the bladed conveyors engage each product by means of several entrainment nibs or teeth, an incorrectly arranged product can result in undesirable interference with the entrainment devices.

Moreover, account must also be taken of the fact that any disalignment from the desired position may be further aggravated during passage from one conveyor to another which is advancing at a faster speed.

Finally, it should be noted that, although it is possible to compensate to a certain extent for limited displacement from the position perpendicular to the direction of entrainment, (for example by the formation of an accumulation) displacement beyond a certain value may become irreversible (for example when the products are arranged at approximately 45° to the direction of advance), with the consequent risk of the product being "chewed up" by the wrapping machine and consequent fouling if not damage to or blockage of the machine itself.

An object of the present invention is to provide apparatus which remedies the aforesaid problems completely and ensures that, at its output, the products are arranged with their principal axes in as perpendicular an orientation as possible to the direction of advance.

According to the present invention, this object is achieved by an apparatus which has at least two conveyor formations which act in the direction of transportation, separate drives for the conveyors which can impart different speeds of movement, sensors for detecting the orientation of each product and generating at least one signal indicative of the displacement of the principal axis of each product from the condition in which its is perpendicular to the transportation direction, and controls which are sensitive to the at least one signal of the sensors to act on the drives for varying the speed of movement of the conveyor formations to annul the displacement.

Essentially, the present invention utilize the known principle according to which, by providing a conveyor comprising two entrainment formations (for example endless conveyor belts) which can be advanced at different speeds, it is possible to vary the orientation of a product transported on the two entrainment formations. For example, it is known to use this principle to rotate products arranged "across" the direction of advance through 90° to make them advance "lengthwise".

Another object of the present invention is to provide a method for orienting the products quickly and efficiently with the use of the apparatus of the type specified above.

This aspect of the present invention is based on the observation that, once the fact that a certain product is advancing with its principal axis not exactly perpendicular to the direction of entrainment has been detected, it is not necessary to wait until the degree of its displacement from the desired position has been detected before the necessary corrective action is initiated.

A further object of the present invention is to provide a method of regulating apparatus of the type specified above to operate preferably in accordance with the method of the present invention.

BRIEF DESCRIPTION OF THE DRAWINGS

These and other features, objects and advantages of the present invention will become more apparent from the following detailed description of a presently preferred embodiment when taken in conjunction with the accompanying drawings, in which.

DETAILED DESCRIPTION OF THE DRAWINGS

Figure 1:
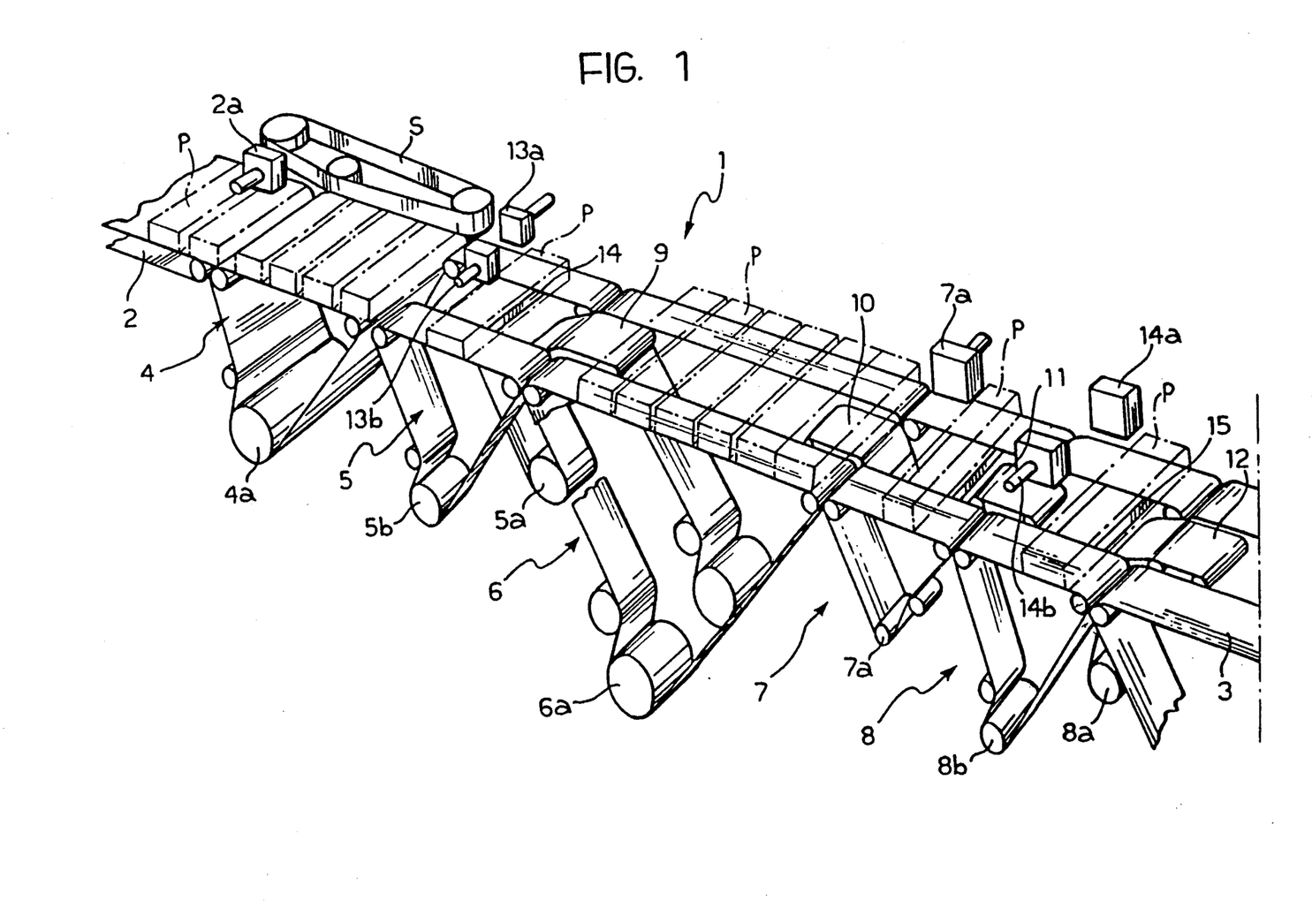
FIG. 1 is a perspective view of part of an automatic packaging plant incorporating two sets of apparatus according to the present invention, with various parts omitted for clarity of illustration.

In FIG. 1, part of the conveyor system of a plant, not illustrated as a whole, for the automatic packaging of products, is generally indicated by the numeral 1.

As an indication, this may, for example, be a plant for forming so-called "multi-pack" packages of products such as bars of chocolate and the like.

In these packages, each article is inserted initially in a respective "flow-pack" or "form-fill-seal" wrapper, constituted essentially by an envelope of sheet material which has a longitudinal seal arranged beneath the product and is closed by two transverse end seals.

For a general description of the criteria by which these wrappers are made, which do not need to be repeated herein, reference may usefully be made, for example, to U.S. Pat. No. 4,761,937 in the name of the same Applicant.

Each individual wrapper thus produced constitutes a product P which is to be handled in the portion of the plant shown in FIG. 1.

More precisely, the individual products P arrive on an input transporter or conveyor 2 (usually of the endlessbelt type) arranged "crosswise", that is with one of their principal axes (usually the major axis) arranged substantially perpendicular to the direction of advance, for supply to an output conveyor 3 (constituted, for example, by a pair of endless, motor-driven belts) for subsequent transfer to a further wrapping machine (not visible in the drawings) in which the products P are inserted in groups into "flow-pack" or "form-fill-seal" packages of larger dimensions so as to produce multiple packages known as "multi-packs".

In the embodiment illustrated, the products P are transferred from the input belt 2 to the output belt 3 by being advanced through a cascade of several conveyors comprising;

- a first transfer conveyor 4 with a belt jogger or register device S (of known type), possibly adjustable, along one side, which jogs the products P as they arrive to ensure that their ends are aligned longitudinally,
- a first orienting conveyor 5 formed in accordance with the invention,
- a further transfer conveyor 6 (which should be considered neutral for the purposes of carrying out the invention) which creates a dynamic accumulation of products P on itself,
- a phasing conveyor 7 which, like the input metering conveyor 2, has an associated photocell 7a (the analogous) photocell of the metering conveyor 2 is indicated 2a) and has the function of ensuring that the products P advance towards the output conveyor 3 with a predetermined phase relationship to a given reference, for example, the entrainment blades or nibs of a conveyor situated still further downstream (not visible in the drawings, and
- a further orienting conveyor 8 whose structures may be considered, to all intents and purposes, identical to that of the orienting device 5 situated further upstream.

The phasing of the products 5 by the conveyor 7 with the aid of its photocell 7a (and possibly by the input metering conveyor 2 with the aid of its photocell 7a is achieved in accordance with known criteria which do not need to be described in detail herein since they are not relevant for an understanding of the invention. In this respect, reference may usefully be made to prior Italian Patent No. 967,479 assigned to the same Assignee and the corresponding British Patent No. 1,412,679.

As can be seen from FIG. 1, all four of the conveyors 5 to 8 in cascade are preferably formed by two belts arranged side by side and oriented in the direction of transportation of the products P which are carried on the upper passes of the belts. The mutual spacing of the belts of each conveyor may be selectively adjustable for better adaptation to the dimensions (size) of the products to be handled. This is achieved by known means which do not need a specific description herein. The criteria adopted for the assembly and drive of the various conveyors are also known.

Usually the drive is ensured by the passage of the lower passes of the bands or belts constituting the conveyors over respective motor-driven rollers arranged below the plan of transportation. In FIG. 1 the rollers and their associated motors in question are indicated by the same numeral as the conveyor followed by a suffix letter, e.g. 4a, 5a, 5b, etc.

It should be noted that, within the conveyor system shown in FIG. 1, there are auxiliary conveyor belts 9 to 12 spanning the gaps between the orienting conveyor 5 and the transfer conveyor 6, between the latter and the timing conveyor 7 and between the timing conveyor 7 and the other orienting conveyor 8 and also between the latter and the output conveyor 3.

The auxiliary conveyors 9, 10, 11 and 12 are arranged in central positions between the pairs of belts constituting the conveyors which they span. The function of the auxiliary conveyors 9 to 12 is to make the transfer of products P between two conveyors in cascade as smooth and even as possible. Experiments carried out by the Applicant have, in fact, shown that, regardless of the solution used for forming the end return loops of the conveyors (rollers, as in the embodiment illustrated in the drawing of FIG. 1, or simple rounded formations, known as "feathers", possibly cooled to prevent overheating), the way in which transfer between belts in cascade is achieved affects the preservation of the exact orientation of the products P relative to their direction of transport.

Thus, while the need to provide auxiliary conveyors, for example, for transfer between the input conveyor 2 and the transfer conveyor 4 and between the latter and the first orienting conveyor 5 (that is before the orientation of the products P has been carried out) is not great, the provision of these conveyors downstream is definitely preferable.

In practice, each auxiliary conveyor 9 to 12 is constituted by a small endless belt whose upper pass rises gradually from below into the transfer region between two conveyors arranged in cascade. The products P being transferred are thus supported in exactly horizontal dispositions exactly in that region in which the belt or belts of the upstream conveyor descend below the transportation plane and pass around the output rollers or rolls and which the belt or belts of the downstream conveyor have not yet reached as they rise from below as a result of passing over the input rollers or rolls of the respective conveyor. Once it has ensured the correct transfer of the products P on to the downstream conveyor, the conveyor pass of the auxiliary conveyor 9 to 12 can gradually descend to form its return pass.

As regards the drive again with reference to the embodiment shown in FIG. 1, the drive for the auxiliary conveyors 9 and 10 may be made subservient to the drive for the conveyor 6 so as to ensure that the speeds of advance of the products correspond exactly. The auxiliary conveyor 11 may, if necessary, be made subservient to the drive for the phasing conveyor 7 while the auxiliary conveyor 12 may be made subservient to the drive for the output conveyor 3.

Naturally these selections are purely indicative and should not be considered absolutely essential or binding.

Figure 2:
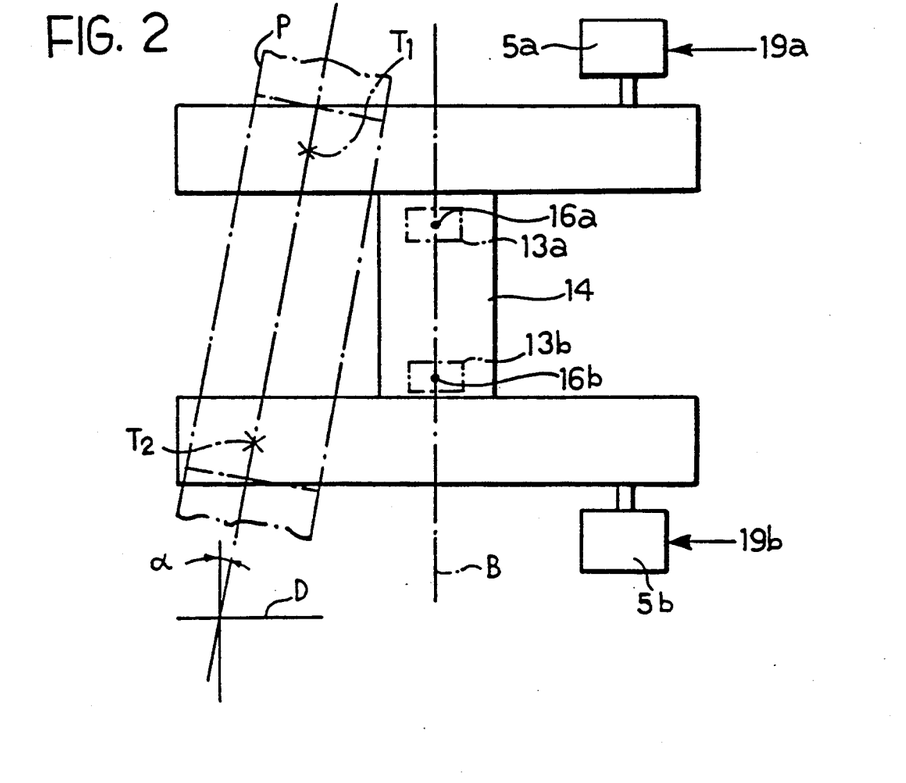
FIG. 2 is a schematic view comparable to a plan view, which shows the structure of the apparatus according to the invention and the problem which it aims to solve.

FIG. 2 shows an imaginary plan view of the two belts or bands constituting the orienting conveyor 5 with their associated motors 5a, 5b.

The following description will refer almost exclusively to this conveyor 5. It should, however, be understood that everything stated applies in a practically identical manner to the other orienting conveyor 8 situated downstream.

Figure 4:
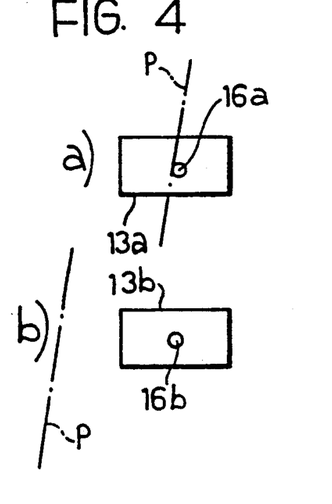
FIGS. 4 to 6 show schematically the operation of the apparatus according to the invention.
Figure 5:
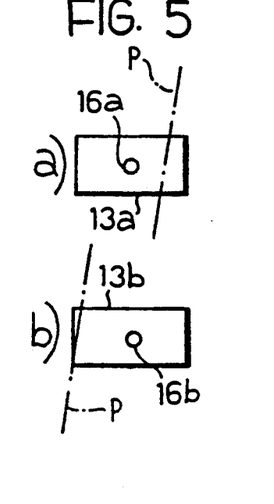
Figure 6:
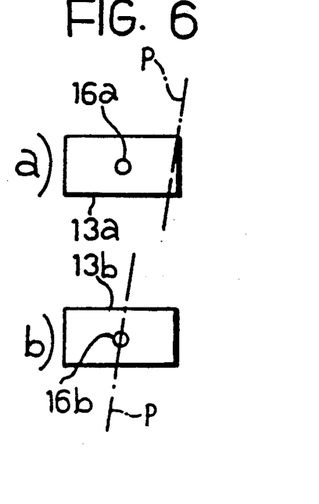

As already stated, the essential purposes of the conveyor 5 is to ensure that every product P which is brought to the input of the conveyor (with the direction of advance from left to right with reference to FIGS. 1 and 2 and also the subsequent FIGS. 4 to 6) with one of its principal axes, typically its major axis $X_P$ is exactly perpendicular to the direction D of advance (angle $=0°$).

According to the invention, this object is achieved essentially by:

detecting the error in the positioning of the product P (that is the amplitude and sense of the angle and altering the speed of the motors 5a, 5b so as to correct the error. In practice, one detects which end of the product P is more advanced than the other and by how much and reduces the speed of advance of the belt on which the more-advanced end is situated and accelerates the other belt, on which the less-advanced, end is situated, until the positioning error is canceled out.

In order to detect the error in the positioning of each product P, sensors, preferably constituted by two photocells 13a, 13b (14a, 14 in the case of the orienting conveyor 8) are used.

As in the case of the photocells 2a and 7a, these products are widely available commercially and are produced, for example, by the company SICK (West Germany).

Preferably, the two photocells 13a, 13b (which naturally may be replaced by functionally equivalent, optical or non-optical sensors) are of the type which operate by reflection. They therefore include, according to widely known criteria, a radiation source which projects a light beam (this term also including radiation outside the visible range, for example infrared radiation) towards a reflective screen 14 (15 in the case of the orienting conveyor 8) which extends transversely, like a bridge between the two belts of the conveyor 5, immediately below their conveyor passes. The screen 14 can thus reflect the radiation towards a light-sensitive element (for example a photodiode) which is incorporated in the same housing as that containing the light source and which is arranged above the plan on which the products P are transported.

When there are no products P in correspondence with the photocells 13a, 13b, all the radiation is reflected by the screen 14 and picked up by the light-sensitive element. When a product P is interposed between the photocell housing and the reflective screen 14, however, the path of propagation of the radiation beam is interrupted and the corresponding photocell therefore emits a detection signal.

The photocells 13a, 13b may generally be considered to act at respective detection points 16a, 16b which are aligned transverse the direction D of transportation of the products so as to define an imaginary barrier B which constitutes a reference for the orientation of the products P.

The selection of photoelectric cells (or similar optical sensors) which operate by transmission is considered preferable in the context of the field of use in question.

Other types of sensors, such as proximity sensors (either optical or non-optical), which are able to detect the passage of the products P on the two conveyor belts 5 without the need for a reflector screen, could, of course, be used.

This type of solution has the advantage that the passage of the two ends of each product P can be detected in positions which are approximately central of the belts of the conveyor 5, that is in positions approximately aligned with the points $T_1$, $T_2$ (regions would be more correct given the difficulty of controlling and modeling the process) around which the ends of the product P rotate relative to the belts of the conveyor during the orienting movement which will be described more fully below.

The use of optical sensors operating by transmission is, however, greatly preferable in terms of reliability and precision of detection.

The operation of proximity sensors is, in fact, greatly affected by the surface characteristics—as well as the shape and size, of course—of the products whose passage is detected.

In an application such as that in question it is, in general, quite difficult to foresee the dimensional characteristics and, in particular, the surface characteristics of the products (as has been seen, the products may either be uncovered or already covered by respective wrappers which may be of material which is more or less reflective, transparent, coloured, etc.).

As will be seen better from the following, however, the location of the optical sensors 13a, 13b in positions which, of necessity, are not aligned with the conveyor belts 5 (usually immediately behind the belts on their inner sides) results in a detection error which must be taken into account according to criteria which will be described more fully below.

Figure 3:
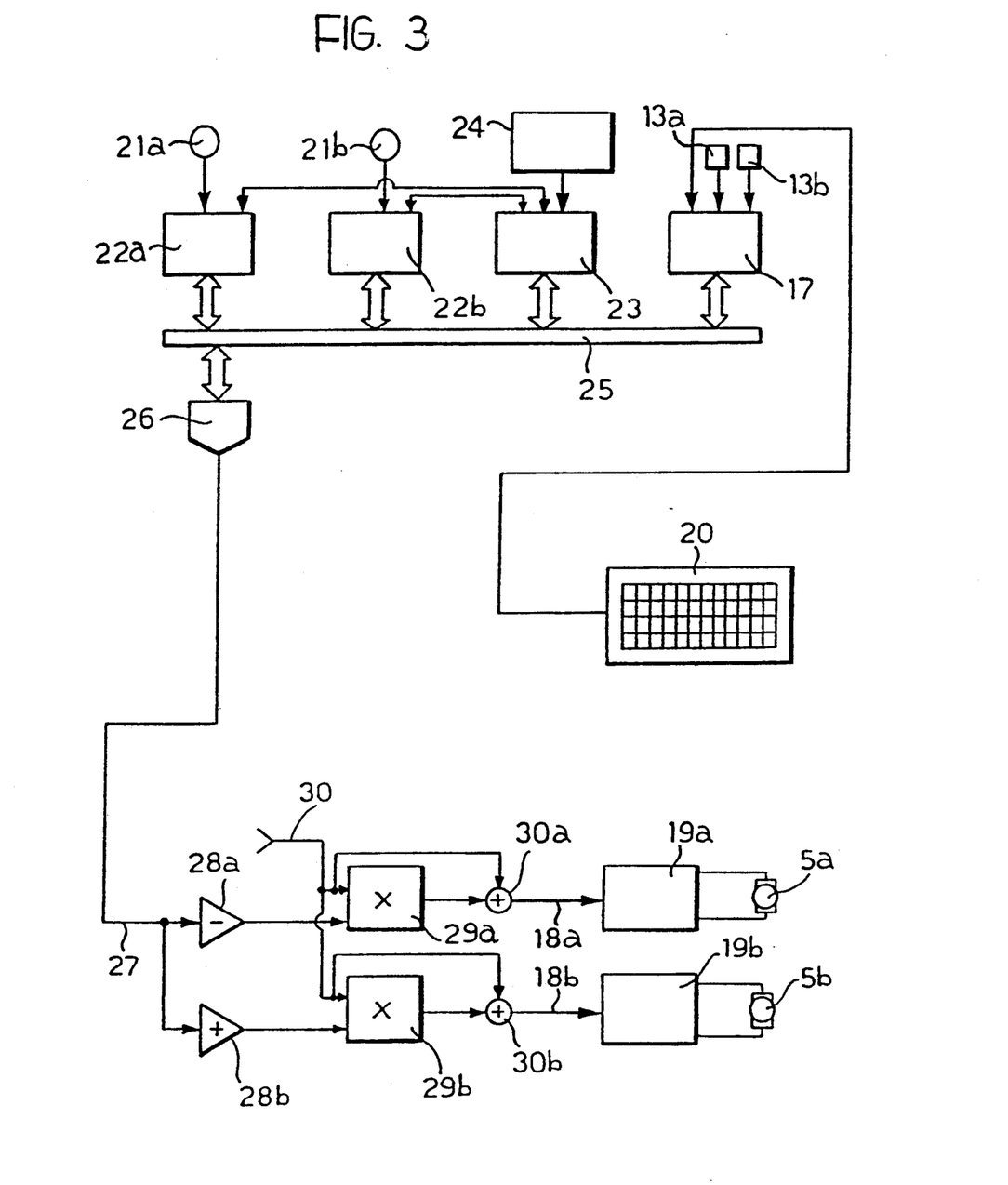
FIG. 3 shows the structure of the control system of the apparatus according to the invention in the form of a block diagram.

FIG. 3 shows the general structure of the control system for the device according to the invention. The system may be formed with the use of a microprocessor (modules 17, 22a and b, 23, 24 and 25) which receives the detection signals generated by the photocells 13a, 13b through an input gate 17 and provides, on output lines 18a, 18b, respective feedback signals to the units 19a, 19b which actuate the motors 5a, 5b which drive the conveyor belts.

A keyboard or similar data-input unit 20 is also connected to the input gate 17 of the microprocessor system and enables data relating, for example, to the different sizes of the products being handled, particularly with regard to the correction factor which will be discussed further below, to be entered into the system.

Two position detectors, typically encoders or resolvers, associated with the motors 5a, 5b are indicated 21a and 21b and can provide respective counters 22a, 22b with on/off-type signals indicative of the positions reached by the motors 5a, 5b, and hence by the belts driven thereby, in accordance with a general feedback control system.

For simplicity, the belt moved by the motor 5a (that on the left with respect to the direction of advance of the products) will be referred to below as the "first belt" while the other belt, moved by the motor 5b, will be termed the "second belt".

The encoder 21a and the counter 22a will therefore be termed simply, the "first encoder" and the "first counter" while the encoder 21b and the counter 22b will be termed the "second encoder" and the "second counter".

The two counters 22a, 22b act under the control of the CPU, indicated 23, of the microprocessor system, which, in particular, can reset the counters 22a and 22b selectively. A memory 24 is also connected to the CPU 23 and correction and size data, for use as will be described below, can be entered therein, for example by the keyboard 20.

The data-instruction bus of the control system is generally indicated by the numeral 25 and is connected to the input of a digital/analog converter 26 whose output line 27 is connected to the inverting and non-inverting inputs respectively of two amplifier units 28a, 28b whose gains are variable selectively. The output of each amplifier 28a, 28b is connected to one of the inputs of a respective multiplier 29, 29b whose other input receives, on a line 30, a signal indicative of the base or reference speed of movement of the conveyor 5, irrespective of the fluctuations imparted to the speeds of the motors 5a, 5b in order to orient the products P.

In practice this speed defines the overall speed of advance of the products P on the conveyor 5.

As will be seen below, the function of the adjustment system which controls the orienting conveyor 5 is selectively to increase or decrease the speed of each of the belts of the conveyor relative to the base speed so as to achieve the desired correction of the orientation.

The output signal of each of the multiplier units 29, 29b is fed to the input of a respective adder unit 30a, 30b which also receives the base speed signal present on the line 30. The output lines of the adder lines 30a, 30b constitute the lines 18a, 18b for piloting the motors 5a, 5b mentioned above.

It will be appreciated that the function of the multipliers 29a and 29b is essentially to apply a corrective increase or decrease (by means of the adder units 30a, 30b) to the base speed signal which is present on the line 30 and is proportional to the value of the base speed.

In other words, this means that the correction signal present on the line 27 in practice depends only on the angular displacement (angle α) of the product from the desired position and is applied automatically to the overall speed of movement of the conveyor 5 as a result of the multiplication carried out in the multiplier units 29a, 29b.

The gain of the amplifiers 28a, 28b defines the speed with which the corrective action is carried out, that is, the intensity of the correction signals which are applied to the actuators 19a, 19b for a given value of the error signal present on the line 27.

The opposite signs of the gains of the amplifiers 28a, 28b are related to the senses of the detected displacements of the products P from the desired orientation.

In the embodiment of FIG. 3 (taken in conjunction with FIG. 2), the error signal is assumed to be positive when the left-hand end of the product P (in the direction of the advance of the product) is further forward than the right-hand end.

In this case, in order to correct the error, it is necessary to slow the left-hand belt (motor 5a) and accelerate the right-hand belt (motor 5b).

For this reason the gain of the amplifier 28a which controls the motor 5a has been shown with a minus sign and a plus sign has been attributed to the gain of the amplifier 28b which controls the motor 5b.

It can immediately be seen that, in the case of the opposite orientation (the left-hand end behind the right-hand end) with the consequent generation of a negative error signal on the line 27, the necessary feedback is provided with the acceleration of the left-hand belt and the slowing of the right-hand belt.

In a first possible embodiment of the present invention, the error signal to be sent to the digital-analog converter 26 or subsequent transmission on the line 27 could be given by the duration of the interval between:
  the time at which the product P reaches the detection point 16a of the photocell 13a and obscures it, and
  the time at which the opposite end of the product P reaches the detection point 16b of the other photocell 13b.

When a product is perfectly aligned (angle $\alpha = 0°$ that is, in an ideal situation) these times coincide and there is no error signal and no correction feedback to the motors 5a and 5b which continue to advance at the same speed identified by the signal present on the line 30.

On the other hand, the greater the interval between the two times of transit in correspondence with the photocells 13a and 13b, the greater is the displacement of the product P from the desired perpendicular condition, therefore, the greater is the feedback signal which must be applied to the motors 5a and 5b to compensate for the displacement.

The type of solution described (the determination of the feedback signal as a function of the interval between the times at which the two ends of the product reach the detection points of the two photocells) has the disadvantage that—in order to correct the position error —it does not make use of the interval between the two times in question.

The currently preferred embodiment of the present invention however, provides for the use of this interval for correction purposes.

In this respect, the present invention is based on the observation that, once that end of the product P which is more advanced (that is the sense of the displacement from the desired perpendicular position) has been identified, it is already possible to intervene in order, at least partly, to correct the displacement.

Thus, with reference to the situation shown in FIG. 2, as soon as the front edge of the product P reaches the detection point 16a of the photocell 13a, it is known immediately that the correction must be carried out in the sense of slowing the movement of the belt driven by the motor 5a and simultaneously increasing the speed of the belt driven by the motor 5b.

This mode of operation has the further advantage of enabling the positioning error to be reduced even before the actual magnitude of the error has been detected.

This fact can immediately be appreciated with reference to the sequence illustrated in FIGS. 4, 5 and 6.

All three FIGS. in question are divided into two parts. The upper part, indicated a), shows the position of the front edge (that is the edge which is more advanced) of the product P relative to the detection point 16a of the photocell 13a. The lower part, indicated b), however, shows the position of the same edge relative to the detection point 16b of the photocell 13b.

Now, as soon as the front edge P reaches the detection point of the photocell 13a (FIG. 4), the system of the present invention intervenes to slow the motor 5a and accelerate the motor 5b.

The overall effect is to impart a left-hand or counter-clockwise rotation to the product P (with reference to the position shown in FIG. 2) and thus bring its principal axis $X_P$ towards the position perpendicular to the direction D of advance so as to reduce the positioning error (FIG. 5).

This corrective action continues until the edge P reaches the detection point 16b of the photocell 13b (FIG. 6).

At this point, the remaining positioning error is sure to be less than the original positioning error (that is the error at the input of the orienting conveyor 5). In other words, the remaining positioning error to be corrected in the remaining portion of the path followed by the product P on the conveyor belts 5 is sure to be less than the original error.

The Applicant has found that it is preferable for the photocells 13a, 13b to be positioned approximately centrally of the overall length of the conveyor 5 (it will be remembered that the distance between the two belts may be adjustable selectively in dependence on the different sizes of the products P handled), taking into account that the belts of the conveyor 5 are about 10–20 cm. long in most applications envisaged.

In more general terms, the portion of the conveyor 5 which is upstream of the imaginary barrier B defined by the photocells 13, 13b must be of a length such as to ensure that, at least in the conditions of current use, the product P is fully loaded on to the conveyor 5 before it reaches the barrier B. The length of the downstream portion must be such as to enable the corrective action to be carried out effectively without the need to impart to the belts speeds relative to the product P such as to cause the product to slide in a manner which is difficult to control.

As regards the initial stage of correction of the positioning error (carried out in the time interval between the instance at which the photocells 13a, 13b are obstructed by the front edge of the product P), it has been found that the correction is more effective if the feedback signal fed through the line 27 is increased with the passage of time, starting from the instant at which the first photocell is obstructed by the front edge of the product P. In practice, this means that the preliminary corrective action is more vigorous the greater the displacement of the product from the ideal position.

Figure 7:
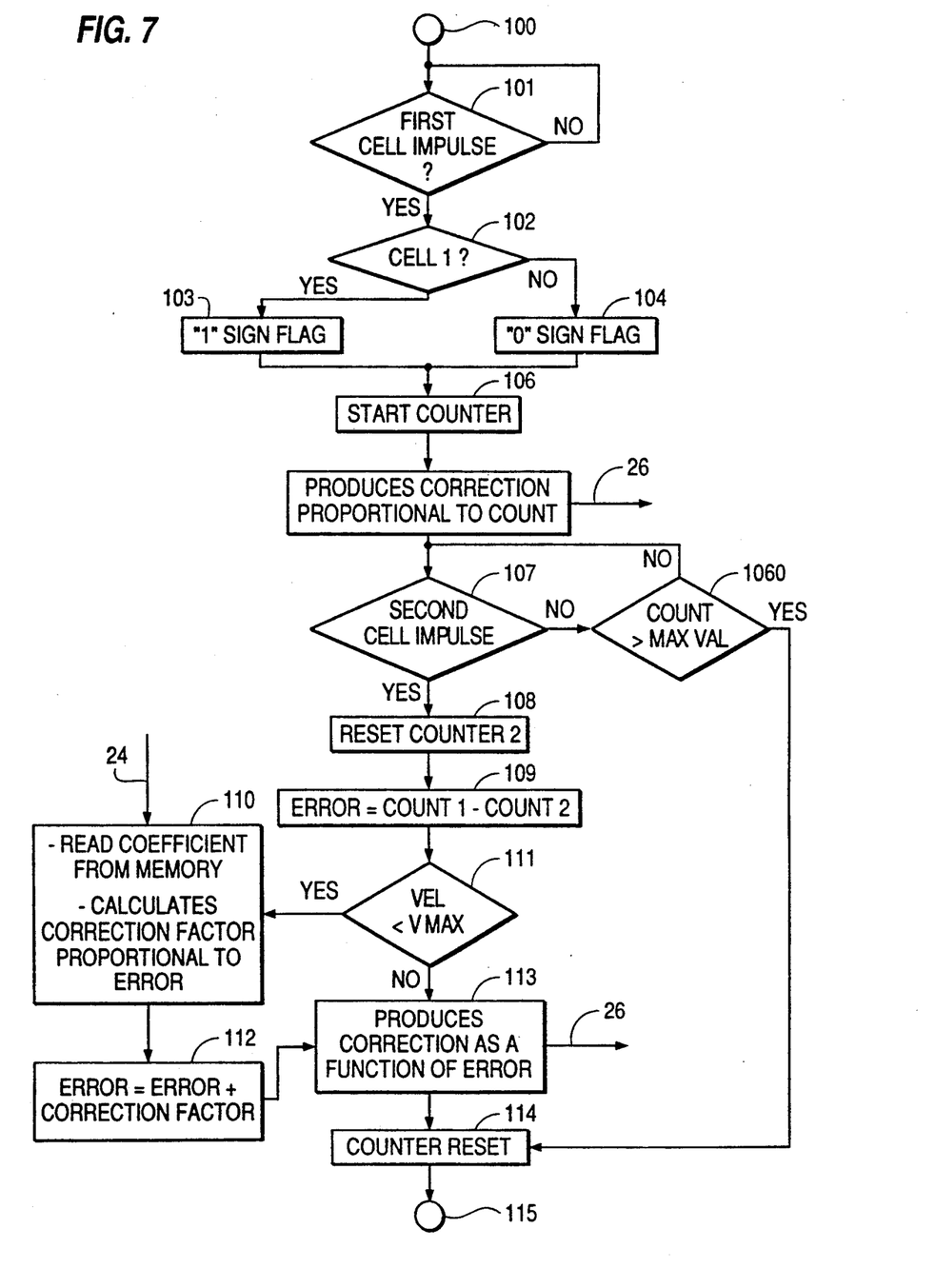
FIG. 7 is a schematic flow chart which illustrates the operation criteria of the system whose block diagram is shown in FIG. 3.

The flow diagram of FIG. 7 shows how this result can be achieved with a circuit layout such as that shown in FIG. 3.

Starting with a stage, generally indicated 100, at which the device is activated, as each product P passes on to the orienting conveyor 5 (the speed of the conveyor and of the conveyors upstream is regulated so as to ensure that only one product P engages the conveyor 5 at a time), in a first stage 101 the system (that is, in practice, the CPU 23) detects the obstruction of one of the photocells 13a, 13b by the front edge of the product P.

In a subsequent decision stage 102, the system identifies which of the two photocells has been obstructed. The sense of the displacement of the product P from the desired perpendicular condition is thus identified (angle α positive or negative). The sense of the displacement is recorded in the system by the setting of flags at two different logic levels which identify the sense of the displacement (stages 103, 104).

For example, with reference to the conventions adopted in FIGS. 2 and 3, the displacement of the product P shown in chain line in FIG. 2, (the left-hand end more advanced than the right-hand end) may be considered a positive displacement (flag set at logic level "1"), while a negative sense is attributed to a displacement in the opposite sense (flag set at logic level "0"). When the sign of the displacement has been identified, the unit 23 (stage 106) starts the counters (22a, 22b) which have previously been reset (stage 114—see below).

The count signal, which is indicative of the advance of the product P (in the specific case this is the count signal of the first counter 22a) is used, taking into account the sign expressed by the flag in stages 103, 104, to generate a correction signal which is sent to the converter 26 (stage 106). The signal in question increases gradually with the passing of time, starting from the instant at which the product P obstructed the first photocell. A correction signal can thus be generated on the line 27 in accordance with the criteria seen above, the signal increasing to a greater extent the more marked the displacement from the desired perpendicular condition. This first correction stage continues until the other photocell is also obstructed by the product P. In a control stage 1060, however, the system checks that the count (for example that of the second counter 22b) has not exceeded a maximum which would indicate that the product was positioned so badly (lengthwise) that it had not obstructed the other photocell. In this case, the system goes straight to stage 114 and gets ready for another cycle with another product.

In the current case, when the other photocell is also obstructed by the product (stage 107) a certain correction of the positioning error has already been achieved. At this point, the second counter (22b) is reset (stage 108) and the difference between the count of the first counter 22a and that of the second, reset counter 22b is sued as indication of the relative displacement of the ends of the product P.

The difference between the counts being evaluated, a signal is obtained which is indicative of the remaining positioning error. This signal can be used as a feedback signal to be sent to the digital/analog converter 26 and to the line 27.

Since the positions 16a, 16b at which the photocells 13a, 13b detect the passage of the front edge of the product P are offset (usually inwardly) relative to the conveyor belts 5, in practice the correction signal obtained as the difference between the counts of the two counters 22a, 22b tends to be an underestimate of the actual displacement (in the direction of advance of the products P) between the points, or rather the regions, $T_1$, $T_2$ about which the rotary movement which brings about the positioning correction then takes place.

In order to achieve a completely satisfactory correction, it is therefore necessary to add a correction factor (KS1) which takes account of the size and geometry of the product P to the correction signal obtained as the difference between the counts of the counters 22a, 22b.

This correction factor is read by the CPU 23 as a result of a reading of the memory 24 in a subsequent stage 110 to which the system proceeds in the event of a positive outcome to a comparison stage 111 in which the system detects whether the overall speed of advance of the 5 (in practice the base speed present on the line 30) is below a certain maximum threshold level.

The reasons which lead to this comparison will be described more fully below.

The correction factor determined by the CPU in stage 110 is added to the feedback signal obtained in stage 109 in a stage 112 so that it can subsequently be used, in a stage 113, to generate the feedback signal which is actually sent to the digital/analog converter 26 in order to correct the error.

Upon completion of stage 113, and a stage 114 in which the counters are reset, the system is ready for the cycle to be repeated (stage 115).

If, in stage 111, the system detects that the overall speed of advance of the system is greater than a predetermined threshold, the correction factor is not applied.

The threshold speed used for the comparison in stage 111 is selected so as to be slightly less than or equal to the speed at which the feedback action on the conveyor belts 5, taking into account the correction factor KS1, might be too violet and cause the uncontrolled sliding of the product P on the conveyor belts 5.

This threshold speed can easily be determined experimentally in dependence on the characteristics of the plant and the characteristics of the products P being handled.

If this speed is reached, and a negative outcome to the comparison in stage 111 the correction factor is not applied (the system passes straight to stage 113). This means that, at least in some cases, the correction of the positions (orientations) of the products P output by the conveyor is incomplete in the sense that the angle may, at least in some cases, still be slightly different from the desired value of 0°.

For this reason it may be preferable (as in the embodiment to which FIG. 1 relates) to provide two orienting conveyors 5, 8 in cascade so that the downstream orienting conveyor (that is the conveyor 8 in the embodiment illustrated) acts as a final corrective for the slight residual error in positioning which may be left by the upstream orienting conveyor.

The two orienting conveyors 5, 8 could be arranged directly in cascade, preferably with an auxiliary conveyor such as one of the conveyors 9 to 12 between the two so as to ensure that the products P are transferred smoothly and evenly and the alignment already achieved by the upstream orienting-conveyor is not disturbed.

Intermediate conveyors may, however, be interposed between the two orienting conveyors 5, 8 either with a dynamic-accumulation function (as in the case of the separator conveyor 6 of the embodiment of FIG. 1) or as phasing conveyors, like the conveyor 7. It should be noted that conveyors of this latter type usually detect the passage of the product P in a central position (see the position of the photocell 7a of FIG. 1) and any residual positioning error does not therefore affect the result of the phasing appreciably.

The size of the correction factor KS1 (stages 110 and 112) cannot easily be determined beforehand. This factor is linked by a proportionality coefficient to the value ($\alpha$) of the displacement of the product from the position perpendicular to the direction D of advance. This is clear from simple geometrical considerations: namely, the more the product is inclined to the desired perpendicular position, the greater the displacement between the detection points 16a, 16b of the photocells and the points $T_1$, $T_2$ about which the orientation of the product takes place. The proportionality coefficient in question is affected by various factors such as the size of the product, both as regards its length (and therefore the positions of the ends relative to the conveyor belts) and as regards its width (which affects the ratio of the rotaty sliding of the product P relative to the belts), or by the characteristics of relative sliding of the product or its wrapper and the material constituting the belts.

The magnitude of the correction factor, and more specifically, the coefficient mentioned, can easily be determined experimentally since it is independent of the speed of movement of the products P on the conveyor 5.

This enables a simple procedure to be carried out to adjust the device 1 in the following terms.

A sample of the products P which are to be handled is arranged at the input of the conveyor 5 in a condition of disalignment from the perpendicular to the direction D of transportation.

The device is then started at low speed (that is in conditions which enable an operator to follow the correcting of the disalignment in the two stages described above visually) and the corresponding correction factor (and hence the coefficient of its proportionality to the displacement) to be applied in order to achieve the desired orientation at the output is thus identified, if necessary by successive attempts.

The coefficient thus identified is confirmed and loaded permanently into the memory 24, for example by means of the keyboard 20. During operation of the device, the CPU 23 will be able to calculate from this the correction factor KS1 to be applied in stage 112 by multiplying it by the displacement detected.

The same adjustment operation can be effected for products P with different characteristics (for example dimensions) so that a set of coefficients is entered in the memory 24 to enable the system to calculate the correction factor to be applied to the type of product P which is being handled at the time, during the operation of the device, in order to achieve the desired correction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for transporting products in a direction of transportation and for orienting them with a principal axis arranged perpendicular to the direction of transportation, comprising:

at least two conveyor formations for products operative in the direction of transportation, separate drive means for said two conveyor formations which can impart different speeds of movement to said two conveyor formations;

sensor means for detecting the orientation of each said product and for generating at least one signal indicative of a displacement of the principal axis of each said product a displacement of the principal axis of each said product from the orientation in which the principal axis of the product is perpendicular to the direction of transportation, wherein said sensor means comprise a pair of sensors aligned traverse to the direction of transportation, whereby the time interval between the instants at which the products pass in correspondence with the pair of sensors is indicative of the displacement, and control means operatively sensitive to the at least one signal generated by said sensor means for controlling the drive means to vary the speed of movement of the conveyor formations in order to annul the displacement, wherein said control means include apparatus configured to be activated when the products pass in correspondence with that one of the sensors which is encountered first by the products, and the signal of the apparatus is used as a signal indicative of the displacement at least until the products pass in correspondence with the other of the sensors, which is the second to be encountered by the products such that corrective action to reduce the displacement is taken immediately upon detection of a direction of the displacement and is completed upon a determination of the amount of the displacement.

2. The apparatus according to claim 1, wherein said conveyor formations have generally endless configurations.

3. The apparatus according to claim 2, wherein said conveyor formations are motor-driven belts with respective upper passes for the transportation of products.

4. The apparatus according to claim 1, wherein said sensor means comprises optical sensors.

5. The apparatus according to claim 1, wherein said sensor means comprise sensors which operate by the transmission of radiation beams across the conveyor path of the products whereby the passage of the products in correspondence with the sensors means interrupts the radiation beams.

6. The apparatus according to claim 1, wherein said sensors are arranged generally out of alignment with the conveyor formations.

7. The apparatus according to claim 1, wherein said control means for controlling said drive means associated with each said conveyor formation, comprise:
  amplifier means supplied with the at least one signal indicative of the displacement, the gain of each amplifier means having the opposite signal from that of the amplifier means associated with the drive means of the other conveyor formation,
  means for providing a signal indicative of the overall speed of transportation of the products,
  multiplier means which act on the output signal of the amplifier means and on a signal indicative of the overall speed of transportation of the products, and
  adder means supplied with the signal output by the multiplier means and with the signal indicative of the overall speed of transportation of the products, the output signal of the adder means piloting said drive means.

8. The apparatus according to claim 1, wherein said control means include further counter means which are reset when the products pass in correspondence with that sensor which is the second to be reached by the products, in that the difference between the count signal of the counter means and the count signal of the further, reset counter means is used to generate the displacement signal after the products have passed in correspondence with that sensor of the two sensors which is the second to be encountered by the products.

9. The apparatus according to claim 6, wherein said control means further includes means for applying predetermined correction factors to the displacement signal, the correction factors preferably being proportional to the displacement signal.

10. The apparatus according to claim 9, wherein said control means further include a threshold function which is sensitive to the overall speed of transportation of the products and can prevent the application of the predetermined correction factors to the displacement signal when the overall speed of transportation of the products exceeds a predetermined threshold level.

11. The apparatus according to claim 1 wherein said counter means are driven by respective sensors elements for sensing the movement of the drive means so that the control means operate according to a general feedback system.

12. The apparatus according to claim 11 wherein said sensors elements comprise one of encoders and resolvers.

13. The apparatus according to claim 1, wherein the apparatus is arranged in cascade with at least one other similar apparatus within a line for conveying products.

14. The apparatus according to claim 13, wherein at least one intermediate conveyor for phasing the products is interposed between the two similar sets of apparatus arranged in cascade.

15. The apparatus according to claim 13, wherein at least one conveyor for accumulating products is interposed between the two similar sets of said apparatus in cascade.

16. The apparatus according to claim 13, wherein an auxiliary conveyor is inserted in the gap defined between the two sets of conveyor apparatus arranged in cascade for ensuring that the products are transferred substantially without their transportation movement being disturbed.

17. A method for controlling the operation of apparatus for transporting products in a direction of transportation and for orienting them with a principal axis thereof arranged perpendicular to the direction of transportation, comprising:
  at least two conveyor formations for the products which act in the direction of transportation, and
  separate drive means for said conveyor formations which can impart different speeds of movement to said two conveyor formations, wherein said method comprises the steps of:
  providing sensor means and forming at least two zones in which the passage of the products is detected, each near a respective one of said conveyor formations,
  detecting with said sensor means the passage of the products in correspondence with that one of the two detection zones which is encountered first by the products so as to identify the direction of the displacement,
  acting on the drive means in a first displacementcorrection stage to create a difference in the speeds of the drive means so as to vary the speeds of movement of the conveyor formations in the sense of reducing the displacement immediately upon detecting the direction of displacement and before determining an amount of the displacement,
  detecting with said sensor means the passage of the products in correspondence with that one of the two detection zones which is the second to be encountered by the products, the interval between the times at which the products pass in correspondence with the two detection zones being indicative of a remaining amount of the displacement to be corrected, and acting on the drive means in a second displacement-correction stage, to create a difference in the speeds of movement of the conveyor formations in order to annul the remaining amount of the displacement.

18. The method according to claim 17, further including, during the first displacement-correction stage, the step of progressively increasing the difference between the speeds of movement of the conveyor formations starting from the passage of the products in correspondence with that one of the two detection zones which is encountered first by the products.

19. The method according to claim 17, wherein said sensors are arranged generally out of alignment with said conveyor formations, and further including a step of applying to the displacement signal predetermined correction factors which are preferably proportional to the displacement signal.

20. The method according to claim 19, and further including a step of detection an overall speed of transportation of the products, and a step of preventing the application of the predetermined correction factors to the displacement signal when an overall speed of transportation of the products exceeds a predetermined threshold level.

21. A method for determining the correction factor referred to in claim 19 the correction factor being proportional to the displacement by a respective coefficient, comprising the steps of:
   a) arranging a product at the input of the apparatus with a displacement from the perpendicular condition,
   b) advancing the apparatus at a generally low speed so as to enable the detection of the effectiveness of the correction of the displacement achieved by the device,
   c) if the correction is effective, identifying the correction factor applied and the value of the displacement,
   d) calculating the respective coefficient, and
   e) storing the coefficient thus calculated.

22. The method according to claim 2, wherein said steps a) to e) are repeated for products with different characteristics and the respective coefficients calculated are stored.

23. An apparatus for transporting products in a direction of transportation and for orienting them with a principal axis arranged perpendicular to the direction of transportation, comprising:

at least two conveyor formations for products operative in the direction of transportation, separate drive means for said two conveyor formations which can impart different speeds of movement to said two conveyor formations, sensor means for detecting the orientation of each said product and for generating at least one signal indicative of a displacement of the principal axis of each said product from the orientation in which the principal axis of the product is perpendicular to the direction of transportation, wherein said sensor means comprises a pair of sensors aligned traverse to the direction of transportation, whereby the time interval between the instants at which the products pass in correspondence with the pair of sensors is indicative of the displacement, and control means operatively sensitive to the at least one signal generated by said sensor means for controlling the drive means to vary the speed of movement of the conveyor formations in order to annul the displacement and configured to be activated when the products pass in correspondence with that one of the sensors which is encountered first by the products so that corrective action is immediately taken upon detection of only a direction of the displacement and to generate a signal indicative of the displacement at least until the products subsequently pass in a correspondence with the other of the sensors such that any remaining displacement is determined and the corrective action is continued to eliminate the remaining displacement.

* * * * *